United States Patent
Al Jurdi et al.

(10) Patent No.: US 11,924,124 B2
(45) Date of Patent: Mar. 5, 2024

(54) SET OF RULES FOR TRIGGERING COORDINATED BEAMFORMING

(71) Applicant: Samsung Electronics Co., Ltd., Suwon-si (KR)

(72) Inventors: Rebal Al Jurdi, Allen, TX (US); Ahmed Atef Ibrahim Ibrahim, Plano, TX (US); Hao Chen, Plano, TX (US); Shiyang Leng, Allen, TX (US); Namjeong Lee, Suwon-si (KR); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 17/576,458

(22) Filed: Jan. 14, 2022

(65) Prior Publication Data

US 2022/0376852 A1 Nov. 24, 2022

Related U.S. Application Data

(60) Provisional application No. 63/192,344, filed on May 24, 2021.

(51) Int. Cl.
*H04W 4/00* (2018.01)
*H04L 5/00* (2006.01)

(52) U.S. Cl.
CPC .......... *H04L 5/0035* (2013.01); *H04L 5/0057* (2013.01); *H04L 5/006* (2013.01)

(58) Field of Classification Search
CPC ..... H04L 5/0035; H04L 5/0057; H04L 5/006; H04L 5/0073
USPC ........................ 370/329, 330, 328
See application file for complete search history.

(56) References Cited

U.S. PATENT DOCUMENTS

| | | | |
|---|---|---|---|
| 8,750,153 B2 | 6/2014 | Kang et al. | |
| 8,750,205 B2 | 6/2014 | Chen et al. | |
| 9,107,087 B2 | 8/2015 | Li et al. | |
| 9,337,906 B2 | 5/2016 | Prasad et al. | |
| 10,263,680 B2 | 4/2019 | Lee et al. | |
| 10,594,427 B2 * | 3/2020 | Davydov | H04B 7/0626 |

(Continued)

FOREIGN PATENT DOCUMENTS

CN 111182629 A 5/2020

OTHER PUBLICATIONS

International Search Report and Written Opinion dated Aug. 12, 2022 regarding International Application No. PCT/KR2022/007124, 8 pages.

*Primary Examiner* — Chuong T Ho

(57) ABSTRACT

A method includes obtaining, by a transmit-receive point (TRP), a set of power metrics for multiple UEs including a served UE and one or more helped UEs, wherein each power metric is estimated from multiple channel quality and performance indicators of one of the multiple UEs. The method also includes calculating a performance metric as a function of at least one of the multiple channel quality and performance indicators of the served UE. The method also includes calculating an interference metric as a function of the set of power metrics. The method also includes determining whether to perform coordinated beamforming based on the performance metric and the interference metric. The method also includes determining one or more precoders based on the determination of whether to perform the coordinated beamforming.

20 Claims, 12 Drawing Sheets

(56) References Cited

U.S. PATENT DOCUMENTS

| | | | |
|---|---|---|---|
| 2012/0014269 A1* | 1/2012 | Ray | H04W 74/006 |
| | | | 370/252 |
| 2013/0301422 A1 | 11/2013 | Caretti et al. | |
| 2016/0036571 A1* | 2/2016 | Park | H04L 5/0048 |
| | | | 370/330 |
| 2017/0237535 A1* | 8/2017 | Park | H04B 7/024 |
| | | | 370/329 |
| 2018/0139017 A1* | 5/2018 | Chen | H04W 88/10 |
| 2018/0262237 A1* | 9/2018 | Chen | H04B 7/0632 |
| 2019/0089431 A1* | 3/2019 | Zhu | H04B 7/0482 |
| 2019/0158152 A1 | 5/2019 | Futaki | |
| 2019/0173549 A1* | 6/2019 | Liang | H04B 7/0658 |
| 2019/0349103 A1* | 11/2019 | Wang | H04L 5/0035 |
| 2019/0349948 A1 | 11/2019 | Fröberg Olsson et al. | |
| 2020/0036490 A1 | 1/2020 | Qian et al. | |
| 2020/0112958 A1* | 4/2020 | Mochizuki | H04L 5/001 |
| 2020/0145068 A1* | 5/2020 | Chendamarai Kannan | |
| | | | H04L 5/0057 |
| 2022/0131582 A1* | 4/2022 | Park | H04B 7/024 |

\* cited by examiner

SET OF RULES FOR TRIGGERING COORDINATED BEAMFORMING

CROSS-REFERENCE TO RELATED APPLICATIONS AND CLAIM OF PRIORITY

The present application claims priority to U.S. Provisional Patent Application Ser. No. 63/192,344, filed on May 24, 2021. The content of the above-identified patent document is incorporated herein by reference.

TECHNICAL FIELD

The present disclosure relates generally to wireless communication systems and, more specifically, the present disclosure relates to a set of rules for triggering coordinated beamforming.

BACKGROUND

Coordinated Multipoint (CoMP) is a suite of techniques introduced in LTE Advanced (3GPP Rel 11) to enhance coverage and throughput particularly at the cell edge. In a legacy cellular network, a UE connects to a single node (e.g., an eNB or gNB), and different nodes perform scheduling and precoding independently. In a CoMP-enabled network, however, the UE connects to multiple nodes, or transmit-receive points (TRPs), forming a CoMP cluster, that collaborate to improve performance by providing diversity or multiplexing gains and interference reduction among other measures.

Coordinated Beamforming (CB) is a CoMP technique that targets interference reduction. This technique is commonly used when there is limited sharing of information between the TRPs of the CoMP cluster. With CB, a TRP (e.g., an eNB or gNB) chooses its precoders so that it reduces, or even nulls, the interference power seen by helped UEs, which are UEs that are served by other TRPs in the CoMP cluster.

SUMMARY

The present disclosure relates to wireless communication systems and, more specifically, to a set of rules for triggering coordinated beamforming.

In one embodiment, a method includes obtaining, by a transmit-receive point (TRP), a set of power metrics for multiple UEs including a served UE and one or more helped UEs, wherein each power metric is estimated from multiple channel quality and performance indicators of one of the multiple UEs. The method also includes calculating a performance metric as a function of at least one of the multiple channel quality and performance indicators of the served UE. The method also includes calculating an interference metric as a function of the set of power metrics. The method also includes determining whether to perform coordinated beamforming based on the performance metric and the interference metric. The method also includes determining one or more precoders based on the determination of whether to perform the coordinated beamforming.

In another embodiment, a TRP includes a memory configured to store instructions. The TRP also includes a processor operably connected to the memory. The processor is configured when executing the instructions to: obtain a set of power metrics for multiple UEs including a served UE and one or more helped UEs, wherein each power metric is estimated from multiple channel quality and performance indicators of one of the multiple UEs; calculate a performance metric as a function of at least one of the multiple channel quality and performance indicators of the served UE; calculate an interference metric as a function of the set of power metrics; determine whether to perform coordinated beamforming based on the performance metric and the interference metric; and determine one or more precoders based on the determination of whether to perform the coordinated beamforming.

In yet another embodiment, a non-transitory computer readable medium includes a plurality of instructions. The plurality of instructions, when executed by at least one processor, is configured to cause the at least one processor to: obtain a set of power metrics for multiple UEs including a served UE of a TRP and one or more helped UEs of the TRP, wherein each power metric is estimated from multiple channel quality and performance indicators of one of the multiple UEs; calculate a performance metric as a function of at least one of the multiple channel quality and performance indicators of the served UE; calculate an interference metric as a function of the set of power metrics; determine whether to perform coordinated beamforming based on the performance metric and the interference metric; and determine one or more precoders based on the determination of whether to perform the coordinated beamforming.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
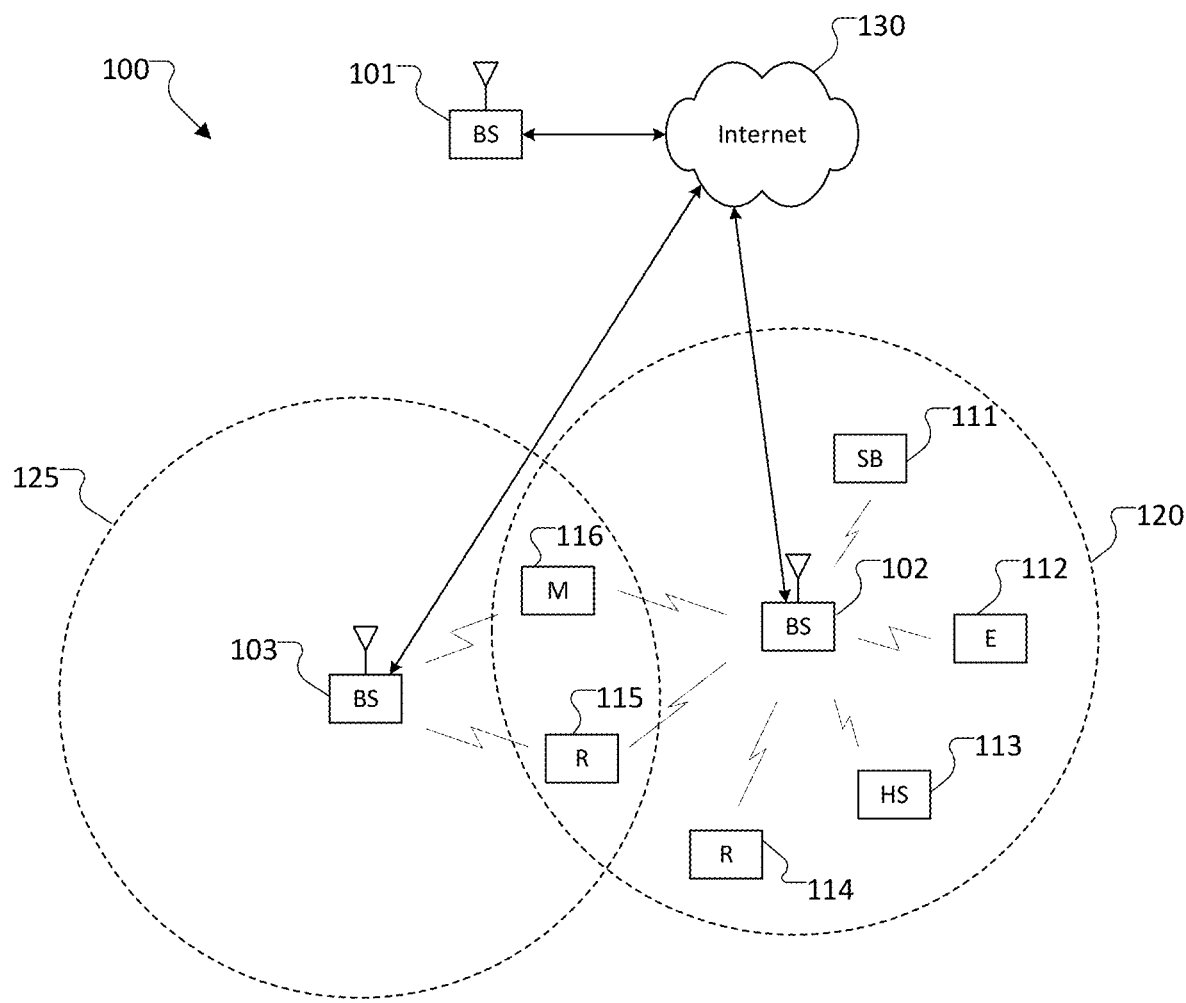
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for implementing a set of rules for triggering coordinated beamforming. In certain embodiments, and one or more of the gNBs 101-103 includes circuitry, programming, or a combination thereof for implementing a set of rules for triggering coordinated beamforming.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
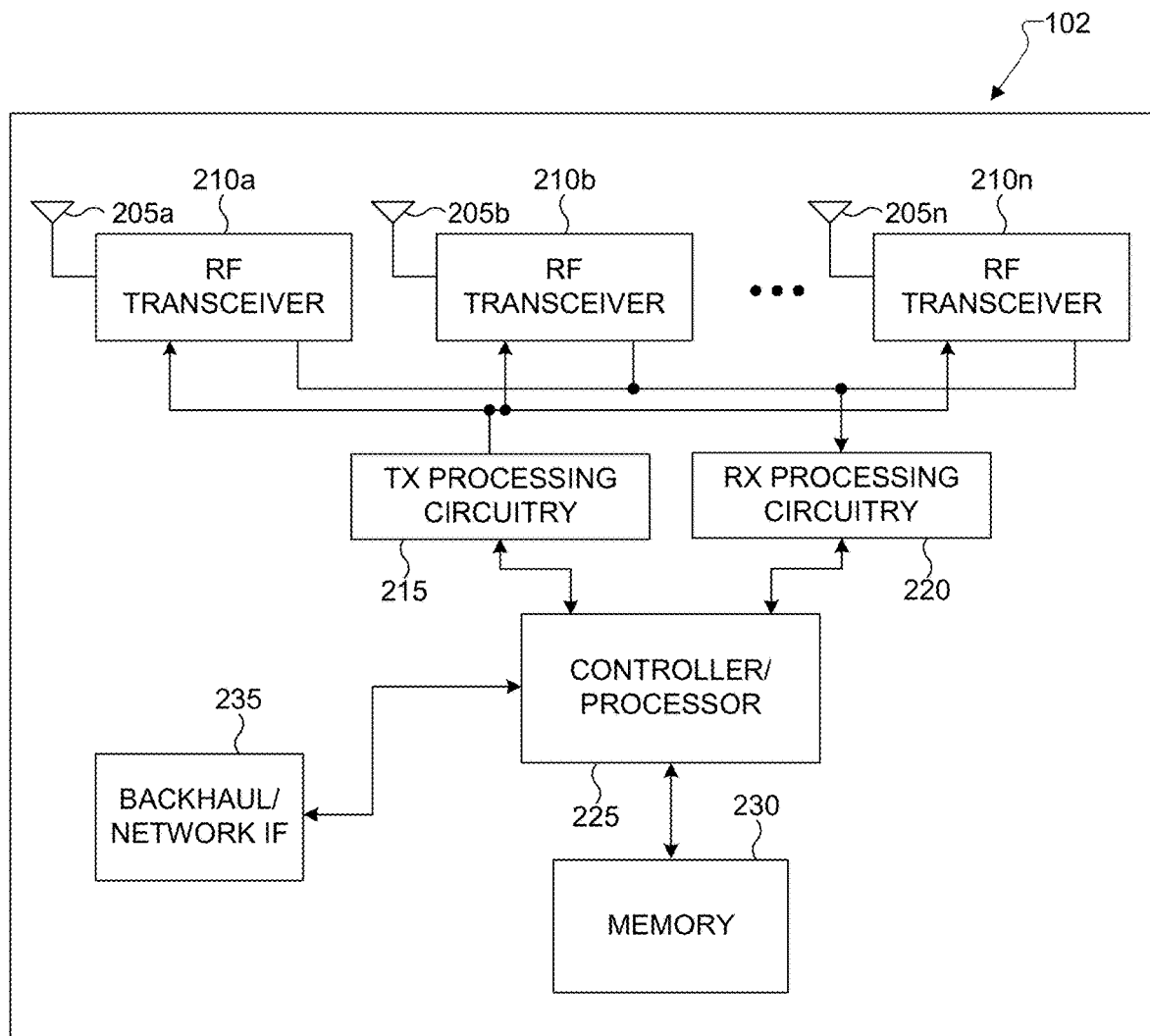
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
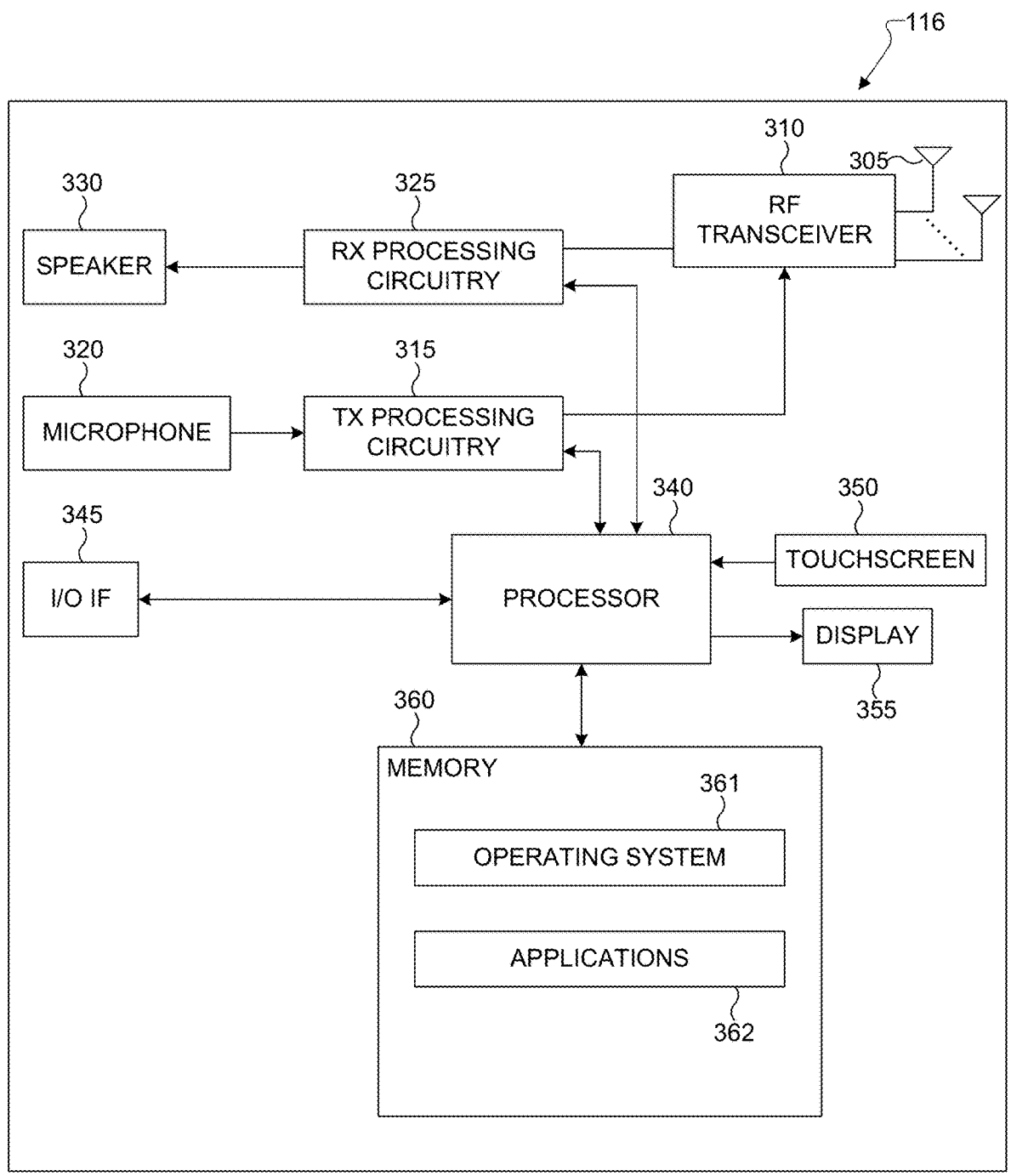
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
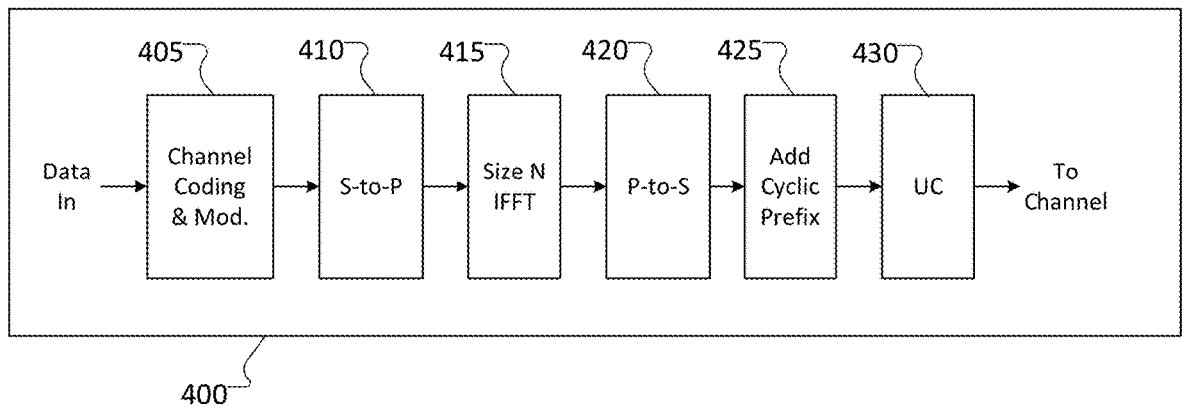
FIG. 4A illustrates a high-level diagram of an orthogonal frequency division multiple access transmit path according to embodiments of the present disclosure.
Figure 4B:
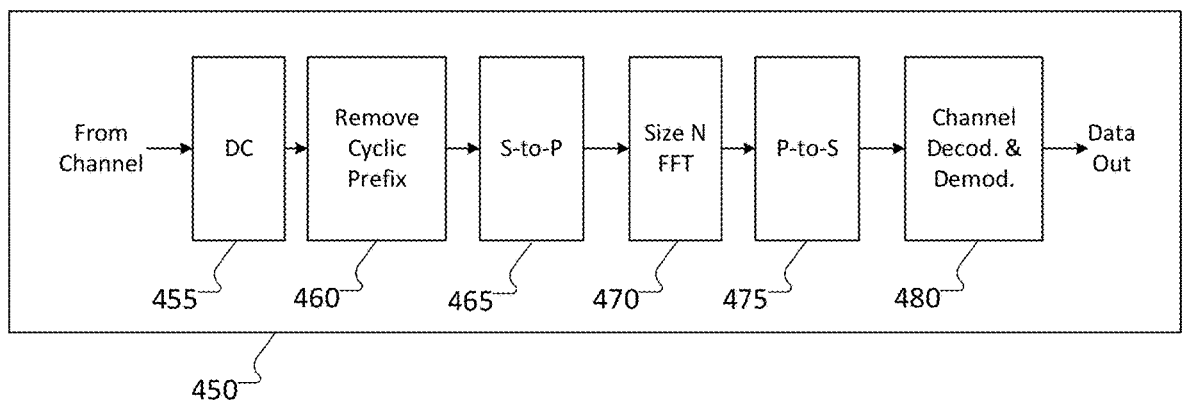
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the gNB 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of the gNBs 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
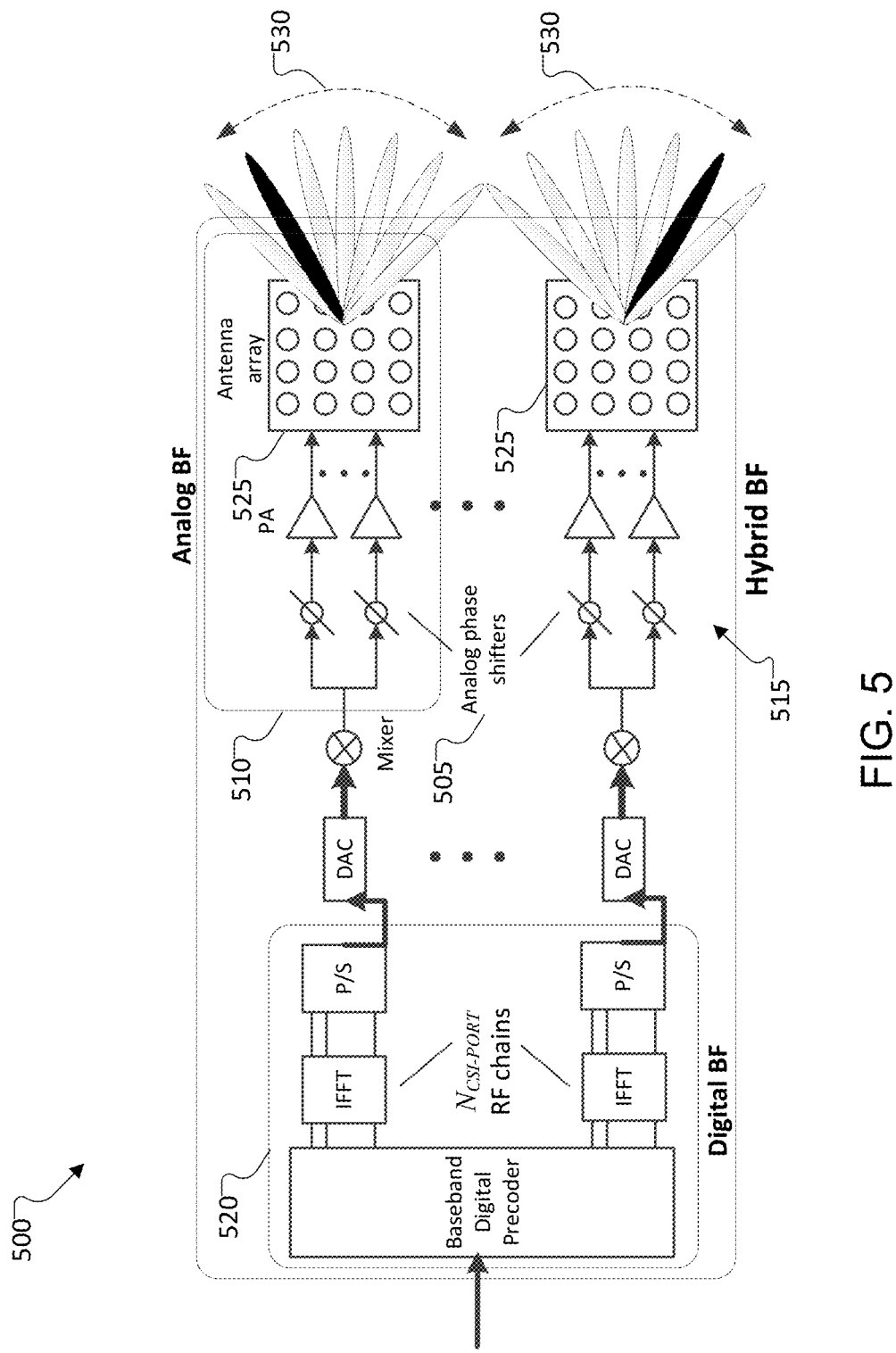
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of the gNB 102 or the UE 116 can include the beamforming architecture 500. For example, one or more of the antenna 205 and its associated systems or the antenna 305 and its associated systems can be configured the same as or similar to the beamforming architecture 500.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NC SI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

As discussed above, CoMP is a suite of techniques introduced in LTE Advanced to enhance coverage and throughput particularly at the cell edge. Coordinated Beamforming (CB), or nulling, is a CoMP technique that targets interference reduction. This technique is commonly used when there is limited sharing of information between the TRPs of the CoMP cluster. With CB, a TRP (e.g. eNB or gNB) chooses its precoders so that it reduces, or even nulls, the interference power seen by helped UEs, which are UEs that are served by other TRPs in the CoMP cluster. A TRP performing CB is referred to in this disclosure as a helping TRP. Interference reduction comes at the expense of signal power loss as seen by the UEs served by the helping TRP, referred to as served UEs in this document.

In many CoMP implementations, there are a number of obstacles to making a nulling decision. First, sharing of information between TRPs of the CoMP cluster can be limited in both size and frequency. Key indicators of a user's channel quality and performance such as the channel state information (CSI)—which can include the Channel Quality Indicator (CQI), Rank Indicator (RI), Precoding Matrix Indicator (PMI), and Sounding Reference Signal (SRS)— are not exchanged between TRPs. When the network is able to transfer such high-dimensional information between TRPs, other CoMP techniques such as Joint Transmission (JT) are favored over CB. Second, the limited number of transmit antennas at a TRP limits the precoder choice when CB is to be performed, potentially jeopardizing the performance of the TRP's served UEs. On the other hand, withholding CB can be detrimental to the helped UEs with interference. Given a TRP's limited access to key user information from the perspective of other TRPs, and given its conflicting goals of serving a UE and shielding another, it is important that an acceptable tradeoff be provided.

To address these and other issues, this disclosure provides a set of rules for triggering CB. As described in more detail below, the disclosed embodiments include a TRP that determines a performance metric and an interference metric for use in triggering CB. In some embodiments, the TRP uses the performance metric, the interference metric, and the disclosed rules to determine whether to perform CB. Note that while some of the embodiments discussed below are described in the context of use in consumer electronic devices, such as smartphones or tablet computers, these are merely examples. It will be understood that the principles of this disclosure may be implemented in any number of other suitable contexts.

Figure 6:
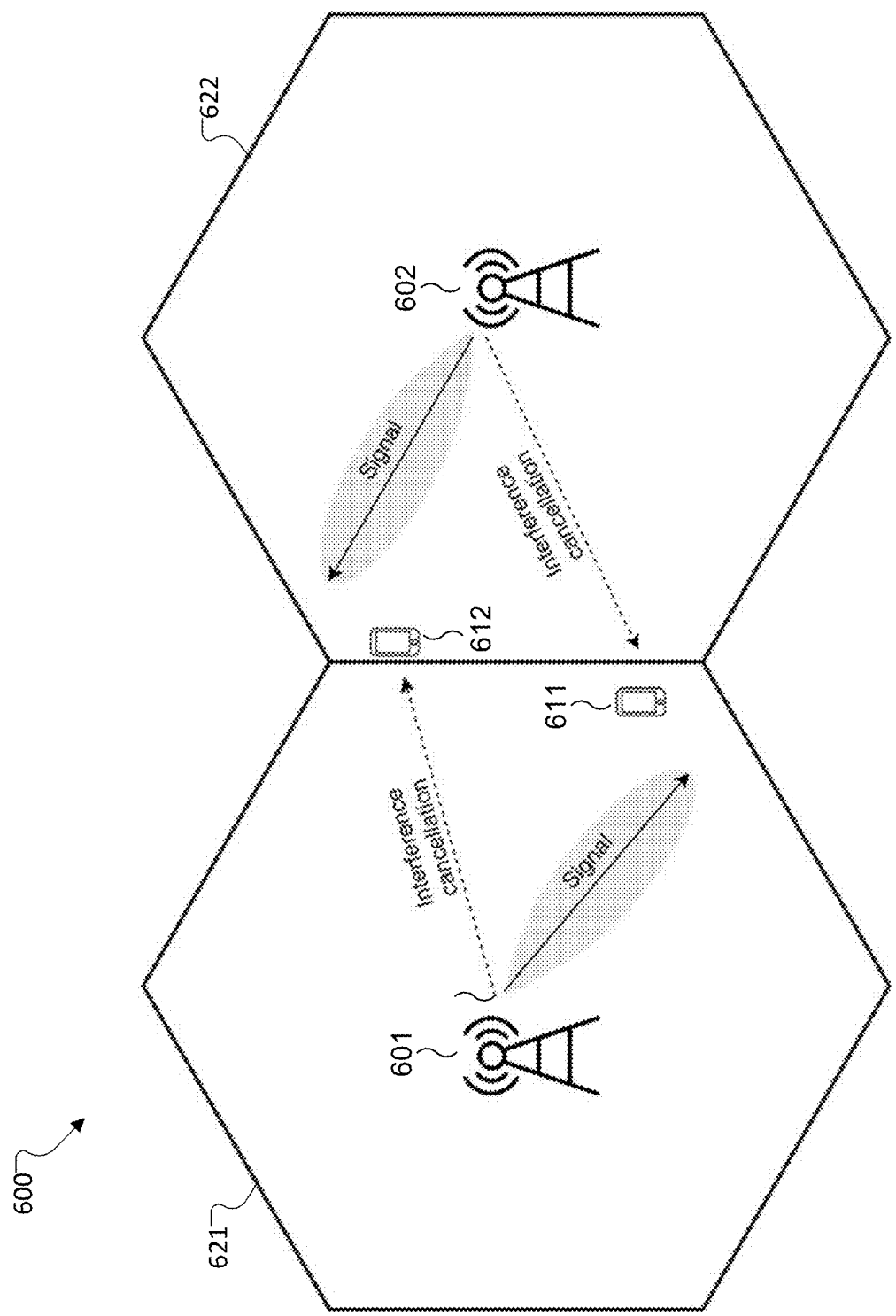
FIG. 6 illustrates an example wireless network in which coordinated beamforming can be performed according to embodiments of the present disclosure.

FIG. 6 illustrates an example wireless network 600 in which CB can be performed according to embodiments of the present disclosure. The embodiment of the wireless network 600 shown in FIG. 6 is for illustration only. Other embodiments of the wireless network 600 could be used without departing from the scope of this disclosure.

As shown in FIG. 6, the wireless network 600 includes two TRPs 601-602 and two UEs 611-612. The TRPs 601-602 are gNBs and can represent (or be represented by) one or more of the gNBs 101-103 of FIG. 1. The UEs 611-612 can represent (or be represented by) one or more of the UEs 111-116 of FIG. 1. Each UE 611-612 receives a transmission from a single TRP 601-602, which is designated as the serving TRP. The TRP 601 serves the UE 611, which is located in a coverage area 621 of the TRP 601. Similarly, the TRP 602 serves the UE 612, which is located in a coverage area 622 of the TRP 602. The coverage areas 621-622 can form a CoMP cluster for performing CoMP.

From the perspective of a TRP, UEs that are associated with a TRP are referred to as UEs served by the TRP, or served UEs for short. UEs that are associated with another TRP in the same CoMP cluster are referred to as UEs helped by the TRP, or helped UEs for short. From the perspective of a UE, a TRP performing CB is referred to as a helping TRP. Interference reduction by the helping TRP comes at the expense of signal power loss as seen by the UEs served by the helping TRP; those are the served UEs of the helping TRP. In the wireless network 600, the TRP 601 is a helping TRP for the UE 612, which is helped by the helping TRP 601. Similarly, the TRP 602 is a helping TRP for the UE 611, which is helped by the helping TRP 602.

In a legacy network, a TRP would choose its precoder or beamformer without collaborating with other TRPs in the network. However, in the network 600, the TRPs 601-602 can perform CB by communicating and exchanging information which allows each TRP 601-602 to perform interference cancellation affecting UEs 611-612 in other cells. For example, the TRP 601 tries to cancel interference experienced by the UE 612, and the TRP 602 tries to cancel interference experienced by the UE 611.

Every TRP 601-602 can perform CB by nulling its transmitted signal in the direction of the helped UE 611-612. While additional UEs may be present in the transmission area of a particular TRP 601-602, this disclosure describes a single user transmission scenario in which, in each transmission time interval, a particular TRP 601-602 transmits to a single UE 611-612 (e.g., single user MIMO).

Although FIG. 6 illustrates one example of a wireless network 600 in which CB can be performed, various changes may be made to FIG. 6. For example, other numbers of TRPs, coverage areas, and UEs could be included in the wireless network 600. Also, various components in FIG. 6 could be combined, further subdivided, or omitted and additional components could be added according to particular needs.

Figure 7A:
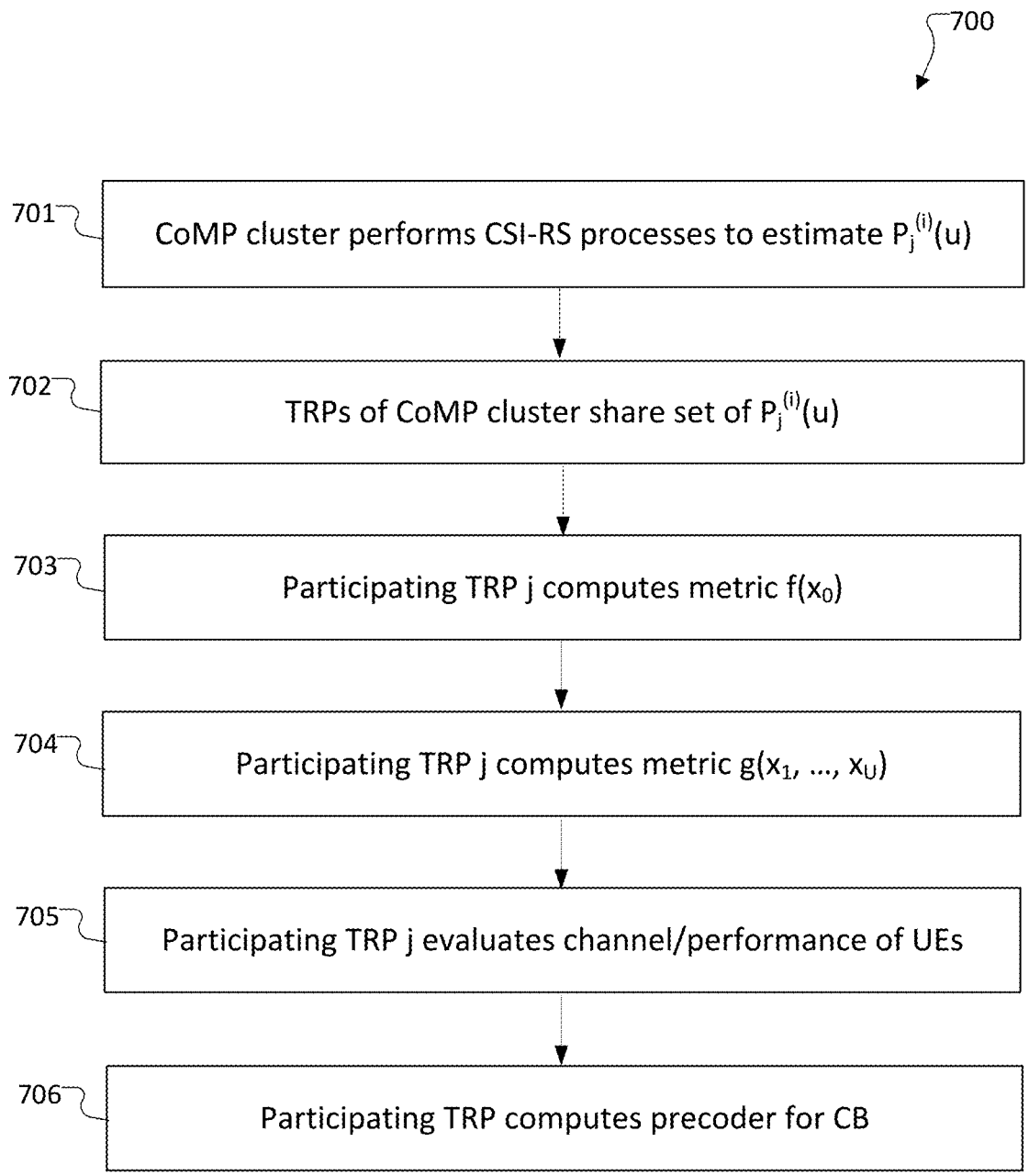
FIGS. 7A through 7C illustrate an example process for implementing a set of rules for triggering coordinated beamforming according to embodiments of the present disclosure.
Figure 7B:
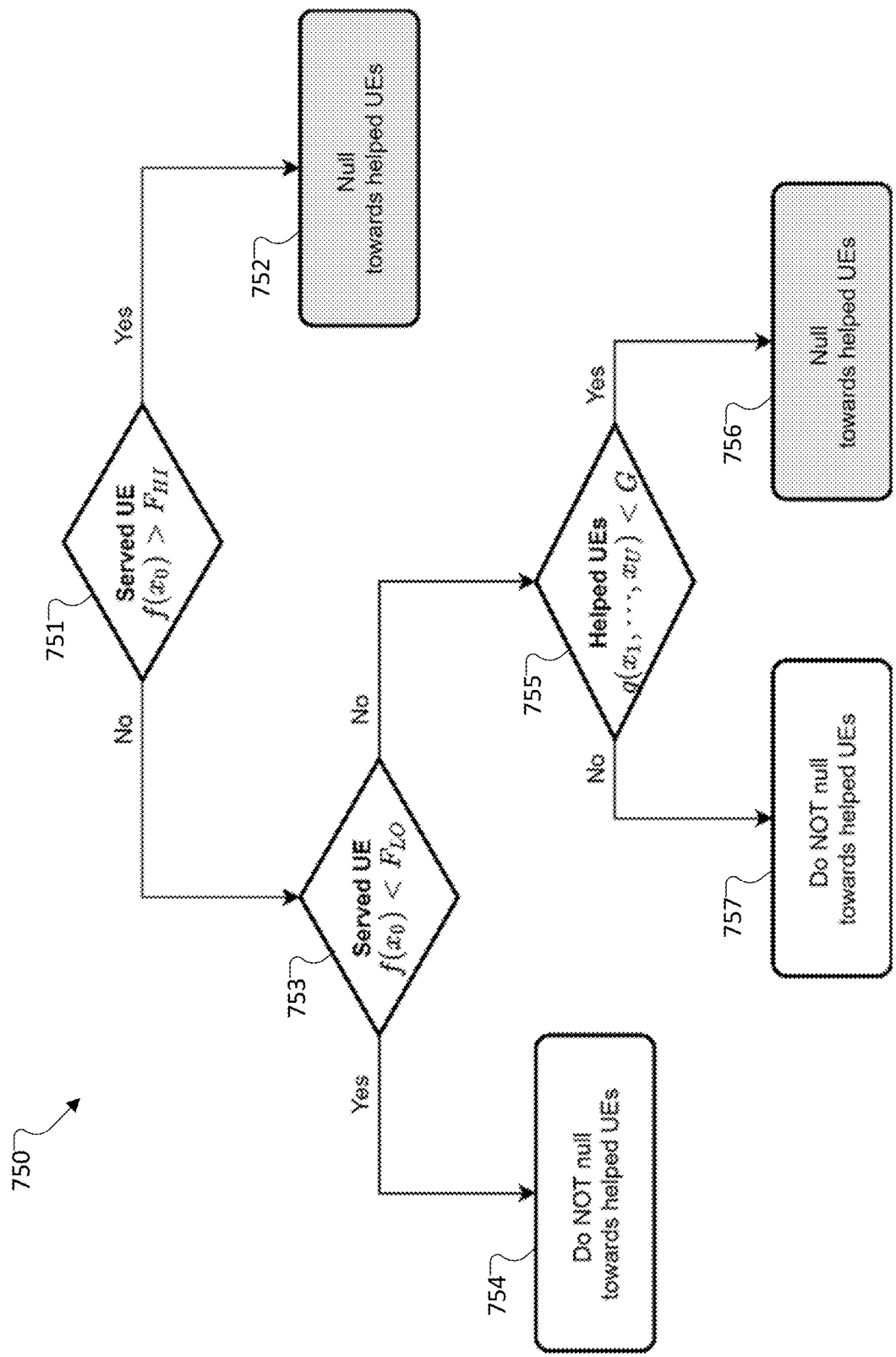
Figure 7C:
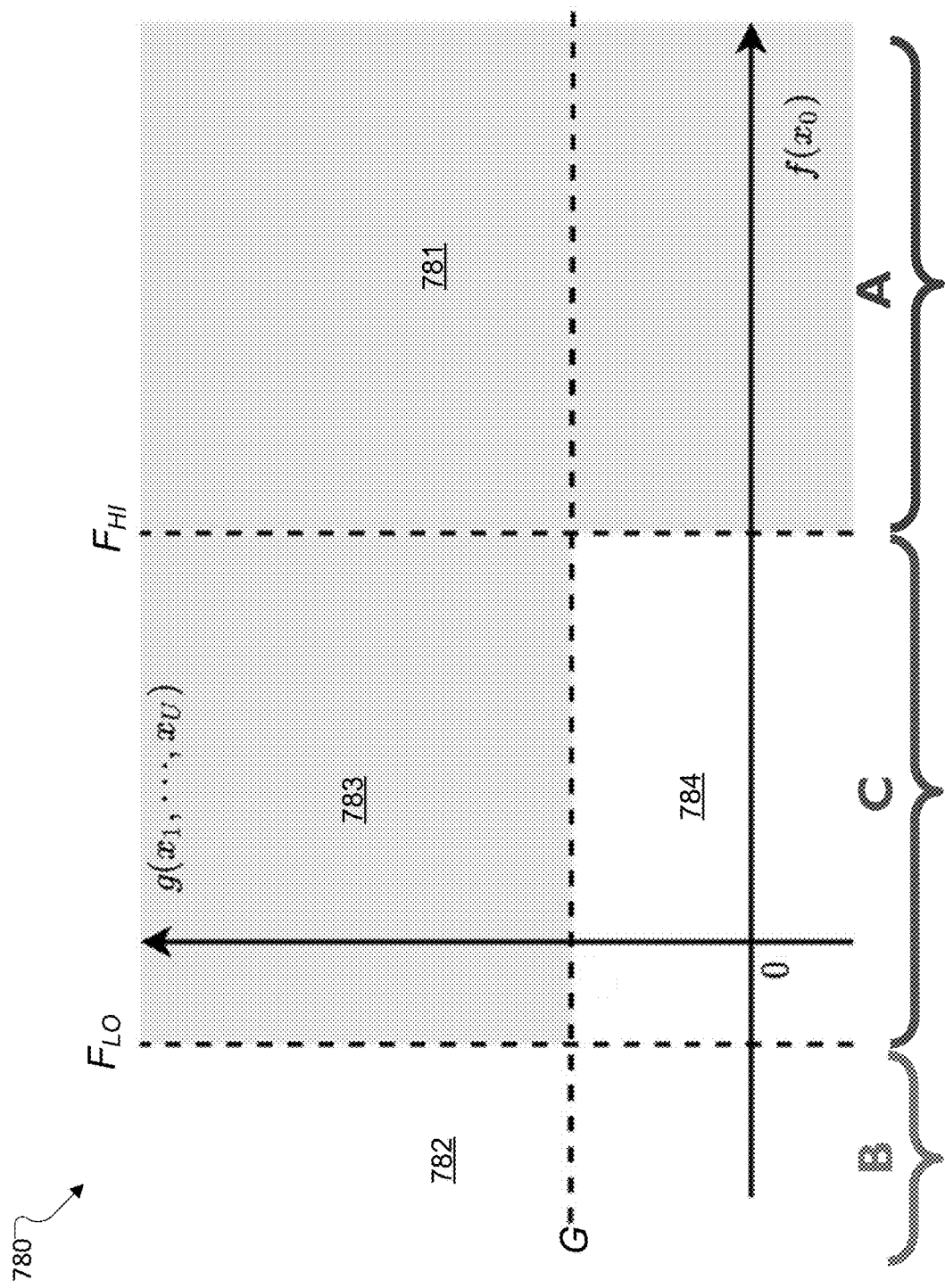

FIGS. 7A through 7C illustrate details of an example process 700 for implementing a set of rules for triggering CB according to embodiments of the present disclosure. In particular, FIG. 7A illustrates operations of the process 700, FIG. 7B illustrates a decision tree 750 that can be traversed during the process 700, and FIG. 7C illustrates a chart 780 providing further details of the process 700. The embodiment of the process 700 shown in FIGS. 7A through 7C is for illustration only. Other embodiments of the process 700 could be used without departing from the scope of this disclosure.

As shown in FIG. 7A, the process 700 includes multiple operations that can be performed by one or more participating TRPs in a CoMP cluster to trigger CB. For ease of explanation, the process 700 will be described as being performed by the TRPs 601-602 of the network 600 to trigger CB. In the following description, the network 600 will be referred to as a CoMP cluster 600.

At operation 701, the CoMP cluster 600 performs multiple successive CSI-RS processes to gauge the impact of interference of every TRP 601-602 on every UE 611-612. That is, the CoMP cluster 600 performs N CSI-RS processes where all but one TRP 601-602 are silent, with N being the number of TRPs 601-602 in the CoMP cluster 600 (e.g., N=2). In each process, every TRP 601-602 obtains one or more channel quality and performance indicators for each UE 611-612, such as the Received Signal Strength Indicator (RSSI), Reference Signal Received Power (RSRP), and Reference Signal Received Quality (RSRQ). Any suitable process may be performed to obtain the desired channel quality and performance indicators. This information is used to estimate $P_j^{(i)}(u)$, which is a power metric that indicates the power received by UE u from interfering TRP j when it is associated with (i.e., served by) TRP i. Specifically, in the CoMP cluster 600 of FIG. 6, the TRP 601 performs the CSI-RS process to estimate $P_1^{(2)}(u)$ while the TRP 602 is silent, and then the TRP 602 performs the CSI-RS process to estimate $P_2^{(1)}(u)$ while the TRP 601 is silent. Any suitable process may be performed to estimate each power metric $P_j^{(i)}$ (u) from the obtained channel quality and performance indicators.

At operation 702, the TRPs 601-602 periodically share the set of estimated power metrics $\{P_j^{(i)}(u)\}$ with each other. For example, in the CoMP cluster 600, the TRP 601 shares its estimated $P_1^{(2)}$ (u) with the TRP 602, and the TRP 602 shares its estimated $P_2^{(1)}$ (u) with the TRP 601. In some embodiments, the TRPs 601-602 can periodically share other information with each other, including other channel quality and performance indicators such as data rate, block error rate (BLER), code rate, modulation order, the number of retransmissions, and the like. The information that is shared among the TRPs 601-602 can be instantaneous, averaged over a finite history, or averaged over the entire history. In some embodiments, the shared information can also include a statistic of a time series of a channel quality and performance indicator, such as the median or other percentile.

At operation 703, each TRP 601-602 in the CoMP cluster 600 computes a performance metric $f(x_0)$ that is a function of at least one of the various channel quality and performance indicators $x_0$ of the served UE 611-612 (e.g., RSSI, RSRP, RSRQ, average data rate, instantaneous feedback CQI, and the like). The performance metric $f(x_0)$ represents any suitable performance metric that is determined from one or more channel quality and performance indicators. In some embodiments, the performance metric $f(x_0)$ can be defined to reflect the served UE's immunity to a loss in signal power. In general, the value of the function $f(x_0)$ increases as the performance of the served UE's performance increases.

At operation 704, each TRP 601-602 in the CoMP cluster 600 computes an interference metric $g(x_1, \ldots, x_U)$ that is a function of the interference seen by the helped UEs 611-612 from the TRP 601-602. In the interference metric $g(x_1, \ldots, x_U)$, the variables, $x_U$ represent the power metrics $P_j^{(i)}$ (u) estimated in operation 701, as discussed above. That is, $$x_1, \ldots, x_U = P_j^{(i1)}(u_1), \ldots, P_j^{(iU)}(u_U),$$

where U+1 is the total number of active UEs to be served in the entire CoMP cluster 600. The interference metric $g(x_1, \ldots, x_U)$ represents any suitable interference metric that is determined from one or more power metrics. In some embodiments, the interference metric $g(x_1, \ldots, x_U)$ can be computed to characterize the interference (i.e., the joint performance loss) experienced by the helped UEs 611-612. In general, the value of the function $g(x_1, \ldots, x_U)$ increases as the interference of the TRP 601-602, as seen by the helped UEs 611-612, increases.

At operation 705, each TRP 601-602 traverses a decision tree 750 (shown in FIG. 7B) to decide whether to perform CB. The decision tree 750 is described as follows with respect to the TRP 601. The TRP 602 traverses the decision tree 750 in the same or similar manner.

In traversing the decision tree 750, the TRP 601 starts at step 751 by checking whether its served UE 611 observes good performance. That is, the TRP 601 determines if the performance metric $f(x_0)$ for its served UE 611 exceeds a first performance threshold $F_{H1}$ that represents good performance. In some embodiments, the first performance threshold $F_{H1}$ can be empirically determined.

If the TRP 601 determines that its served UE 611 observes good performance (i.e., $f(x_0)>F_{H1}$), then at step 752, the TRP 601 decides to perform CB.

Alternatively, if the TRP 601 determines that its served UE 611 does not observe good performance (i.e., $f(x_0) \leq F_{H1}$), then at step 753, the TRP 601 checks whether its served UE 611 observes poor performance. That is, the TRP 601 determines if $f(x_0)$ for the UE 611 falls below a second performance threshold $F_{LO}$ that represents poor performance. In some embodiments, the second performance threshold $F_{LO}$ can be empirically determined.

If the TRP 601 determines that its served UE 611 observes poor performance (i.e., $f(x_0)<F_{LO}$), then at step 754, the TRP 601 protects the served UE 611 by withholding CB operation.

Alternatively, if the TRP 601 determines that its served UE 611 does not observe poor performance (i.e., $f(x_0) \geq F_{LO}$), then the TRP 601 determines that the performance of the served UE 611 falls in the middle between the first performance threshold $F_{H1}$ and the second performance threshold $F_{LO}$. The TRP 601 then turns to the performance of the helped UE 612. Specifically, at step 755, the TRP determines if the helped UE 612 sees poor performance. That is, the TRP 601 determines if the interference metric $g(x_1, \ldots, x_U)$ for the helped UE 612 is less than a third performance threshold G that represents poor performance. In some embodiments, the third performance threshold G can be empirically determined.

If the TRP 601 determines that its helped UE 612 observes poor performance (i.e., $g(x_1, \ldots, x_U)<G$), then at step 756, the TRP 601 decides to perform CB. Alternatively, if the TRP 601 determines that its helped UE 612 does not observe poor performance (i.e., $g(x_1, \ldots, x_U) \geq G$), then at step 757, the TRP 601 decides to withhold CB.

FIG. 7C illustrates a chart 780 that graphically represents the decisions of the TRP 601 in the decision tree 750. As shown in FIG. 7C, the chart 780 is a two-dimensional plane defined by axes that correspond to the performance metric $f(x_0)$ and the interference metric $g(x_1, \ldots, x_U)$. In accordance with the decisions of the TRP 601 in the decision tree 750, the chart 780 is divided into four regions.

The region 781 (identified by the letter 'A') is the region where the performance metric $f(x_0)$ is greater than the first performance threshold $F_{H1}$ (i.e., $f(x_0)>F_{H1}$). The region 781 is where the served UE 611 sees a good channel, or experiences good performance, and can withstand signal power loss. Thus, the TRP 601 can perform CB, as determined at step 752.

The region 782 (identified by the letter 'B') is the region where the performance metric $f(x_0)$ is less than the second performance threshold $F_{LO}$ (i.e., $f(x_0)<F_{LO}$). The region 782 is where the served UE 611 sees a poor channel, or experiences poor performance, and cannot withstand signal power loss. Thus, the TRP 601 protects the served UE 611 by withholding CB operation, as determined at step 754.

The regions 783 and 784 (corresponding to the letter 'C') are the regions where the performance metric $f(x_0)$ is between the first performance threshold $F_{H1}$ and the second performance threshold $F_{LO}$ (i.e., $F_{LO}<f(x_0)<F_{H1}$). Within the regions 783 and 784, the helped UE 612 may or may not benefit from a reduction in interference, and where a loss in signal power seen by the served UE 611 can be traded off for a loss in interference power observed by the helped UE 612.

In the regions 783 and 784, the determination to perform CB is based on the comparison of the interference metric $g(x_1, \ldots, x_U)$ for the helped UE 612 to the third performance threshold G. The region 783 is where the interference metric $g(x_1, \ldots, x_U)$ for the helped UE 612 is greater than the third performance threshold G (i.e., $g(x_1, \ldots, x_U)>G$). In the region 783, the helped UE 612 is experiencing significant interference, and the TRP 601 decides to help the helped UE 612 by performing CB, as determined at step 756. Conversely, the region 784 is where the interference metric $g(x_1, \ldots, x_U)$ for the helped UE 612 is less than the third performance threshold G (i.e., $g(x_1, \ldots, x_U)<G$). In the region 784, the interference observed by the helped UE 612 is not substantial, and helping the helped UE 612 is not necessary and could be detrimental to the service of the served UE 611. In the region 784, the TRP 601 decides to withhold CB, as determined at step 757.

Returning to FIG. 7A, at operation 706, if the TRP 601 decides to perform CB, the TRP 601 determines a precoder for CB (e.g., via Zero-Forcing or another suitable algorithm or technique), in order to null the transmitted signal of the TRP 601 in the direction of the helped UE 612. This has the effect of canceling (or significantly reducing) the interference seen by the helped UE 612.

Although FIGS. 7A through 7C illustrates one example of a process 700 for implementing a set of rules for triggering CB, various changes may be made to FIGS. 7A through 7C. For example, while the process 700 is described as involving a TRP that helps only one helped UE, other embodiments could include more than one helped UE. Also, while shown as a series of steps, various steps in FIG. 7A through 7C could overlap, occur in parallel, occur in a different order, or occur any number of times.

Figure 8:
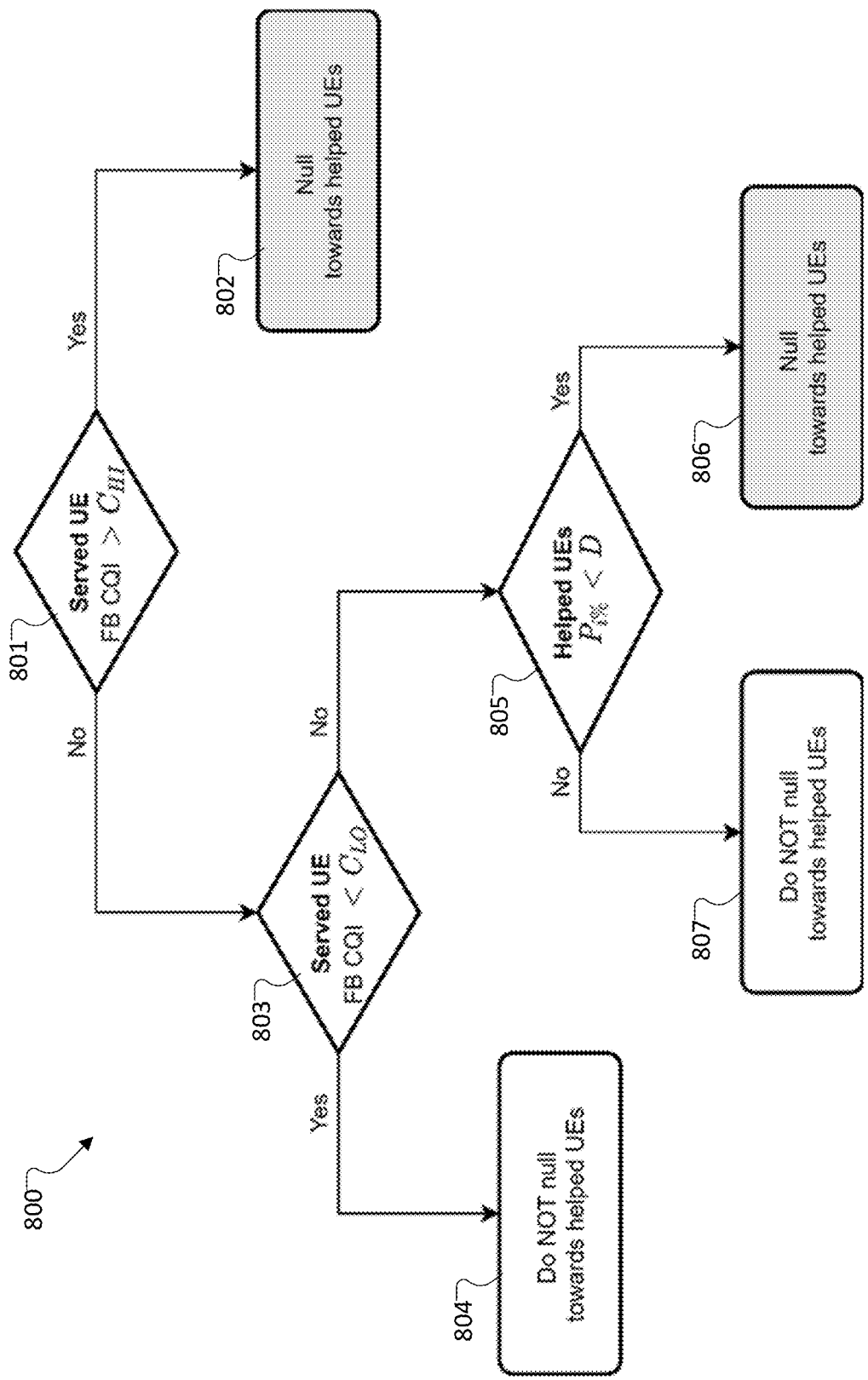
FIGS. 8 and 9 illustrate example CB decision trees that can be traversed during the process of FIG. 7A according to embodiments of the present disclosure.

FIG. 8 illustrates another example CB decision tree 800 that can be traversed during the process 700 according to embodiments of the present disclosure. In particular, the CB decision tree 800 can be traversed instead of the decision tree 750 of FIG. 7B. The embodiment of the CB decision tree 800 shown in FIG. 8 is for illustration only. Other embodiments of the CB decision tree 800 could be used without departing from the scope of this disclosure.

As shown in FIG. 8, the CB decision tree 800 branches according to the CQI of served UE 611 and the i-th percentile of the difference between the RSRP and the RSRQ of the helped UE 612. That is, in the embodiment shown in FIG. 8, the performance metric $f(x_0)$ can be the CQI of the served UE 611 obtained from its feedback report. In other embodiments, $f(x_0)$ could be the RI, PMI, or SRS of the served UE 611. The interference metric $g(x_1, \ldots, x_U)$ can be defined as $P_{i\ \%}$, which is the i-th percentile of $\{P_j^{(i)}(u)\}_{i,u}$, the set of interference powers received from TRP j (i.e., the TRP 601) as seen by helped UEs u (i.e., the UE 612) served by TRP i (i.e., the TRP 602). Alternatively, the interference metric $g(x_1, \ldots, x_U)$ can be defined as another metric indicating the interference seen by the helped UEs.

The decision tree 800 is described as follows with respect to the TRP 601. The TRP 602 traverses the decision tree 800 in the same or similar manner.

In traversing the decision tree 800, the TRP 601 starts at step 801 by checking whether its served UE 611 observes good performance. That is, the TRP 601 determines if the CQI for its served UE 611 exceeds a performance threshold $C_{H1}$ that represents good performance. In some embodiments, the performance threshold $C_{H1}$ can be empirically determined.

If the TRP 601 determines that its served UE 611 observes good performance (i.e., CQI>$C_{H1}$), then at step 802, the TRP 601 decides to perform CB.

Alternatively, if the TRP 601 determines that its served UE 611 does not observe good performance (i.e., CQI≤$C_{H1}$), then at step 803, the TRP 601 checks whether its served UE 611 observes poor performance. That is, the TRP 601 determines if CQI for the UE 611 falls below a performance threshold $C_{LO}$ that represents poor performance. In some embodiments, the performance threshold $C_{LO}$ can be empirically determined.

If the TRP 601 determines that its served UE 611 observes poor performance (i.e., CQI<$C_{LO}$), then at step 804, the TRP 601 protects the served UE 611 by withholding CB operation.

Alternatively, if the TRP 601 determines that its served UE 611 does not observe poor performance (i.e., CQI≥$C_{LO}$), then the TRP 601 determines that the performance of the served UE 611 falls in the middle between the performance threshold $C_{H1}$ and the performance threshold $C_{LO}$. The TRP 601 then turns to the performance of the helped UE 612. Specifically, at step 805, the TRP determines if the helped UE 612 sees poor performance. That is, the TRP 601 determines if the interference metric $P_{i\ \%}$ for the helped UE 612 is less than a performance threshold D that represents poor performance. In some embodiments, the performance threshold D can be empirically determined.

If the TRP 601 determines that its helped UE 612 observes poor performance (i.e., $P_{i\ \%}$<D), then at step 806, the TRP 601 decides to perform CB. Alternatively, if the TRP 601 determines that its helped UE 612 does not observe poor performance (i.e., $P_{i\ \%}$≥D), then at step 807, the TRP 601 decides to withhold CB.

Figure 9:
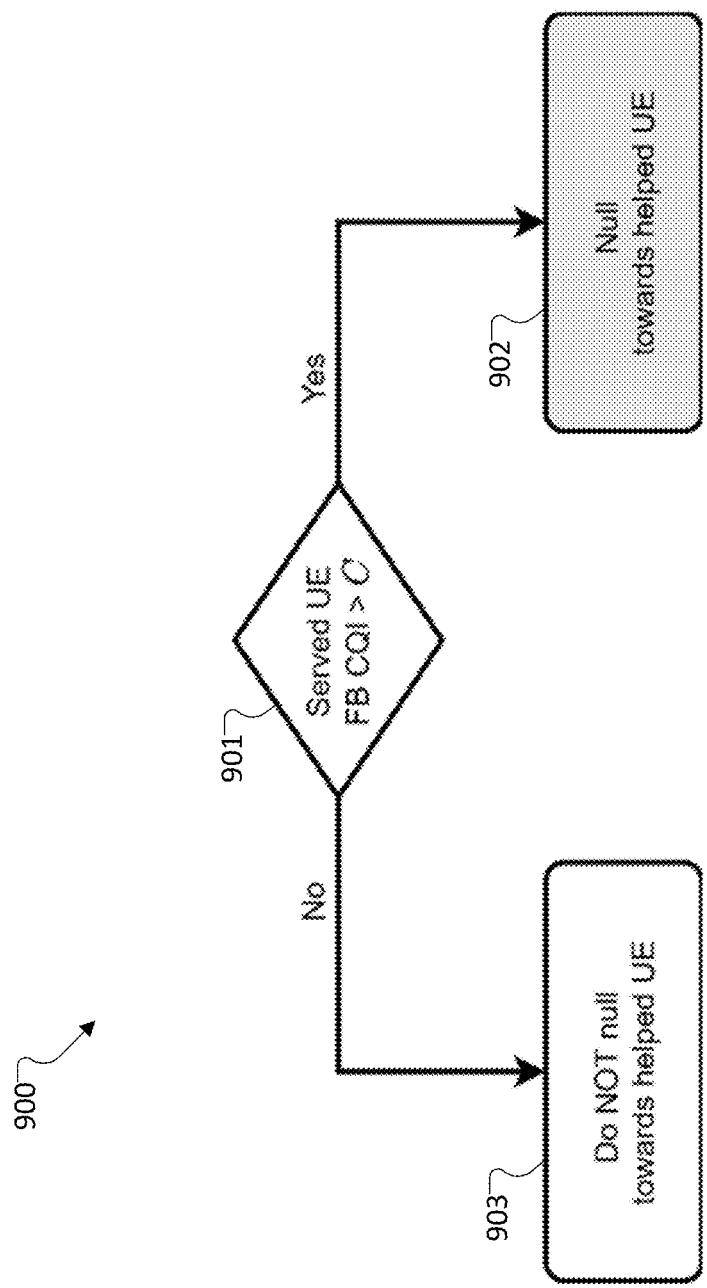

FIG. 9 illustrates yet another example CB decision tree 900 that can be traversed during the process 700 according to embodiments of the present disclosure. In particular, the CB decision tree 900 can be traversed instead of the decision tree 750 of FIG. 7B. The embodiment of the CB decision tree 900 shown in FIG. 9 is for illustration only. Other embodiments of the CB decision tree 900 could be used without departing from the scope of this disclosure.

As shown in FIG. 9, the CB decision tree 900 is based only on the performance of served UE 611. That is, the TRP 601 can disregard the performance of the helped UE 612 and make a CB decision based solely on the performance of the served UE 611. This is functionally equivalent to choosing $C_{H1}=C_{LO}$ in the embodiment described in FIG. 8. The decision tree 900 is described as follows with respect to the TRP 601. The TRP 602 traverses the decision tree 900 in the same or similar manner.

In traversing the decision tree 900, the TRP 601 starts at step 901 by checking whether its served UE 611 observes good performance. That is, the TRP 601 determines if the CQI for its served UE 611 exceeds a performance threshold C that represents good performance. In some embodiments, the performance threshold C can be empirically determined.

If the TRP 601 determines that its served UE 611 observes good performance (i.e., CQI>C), then at step 902, the TRP 601 decides to perform CB. Alternatively, if the TRP 601 determines that its served UE 611 does not observe good performance (i.e., CQI≤C), then at step 903, the TRP 601 protects the served UE 611 by withholding CB operation.

Although FIGS. 8 and 9 illustrate other examples of CB decision trees that can be traversed during the process 700, various changes may be made to FIGS. 8 and 9. For example, while shown as a series of steps, various steps in FIGS. 8 and 9 could overlap, occur in parallel, occur in a different order, or occur any number of times.

Figure 10:
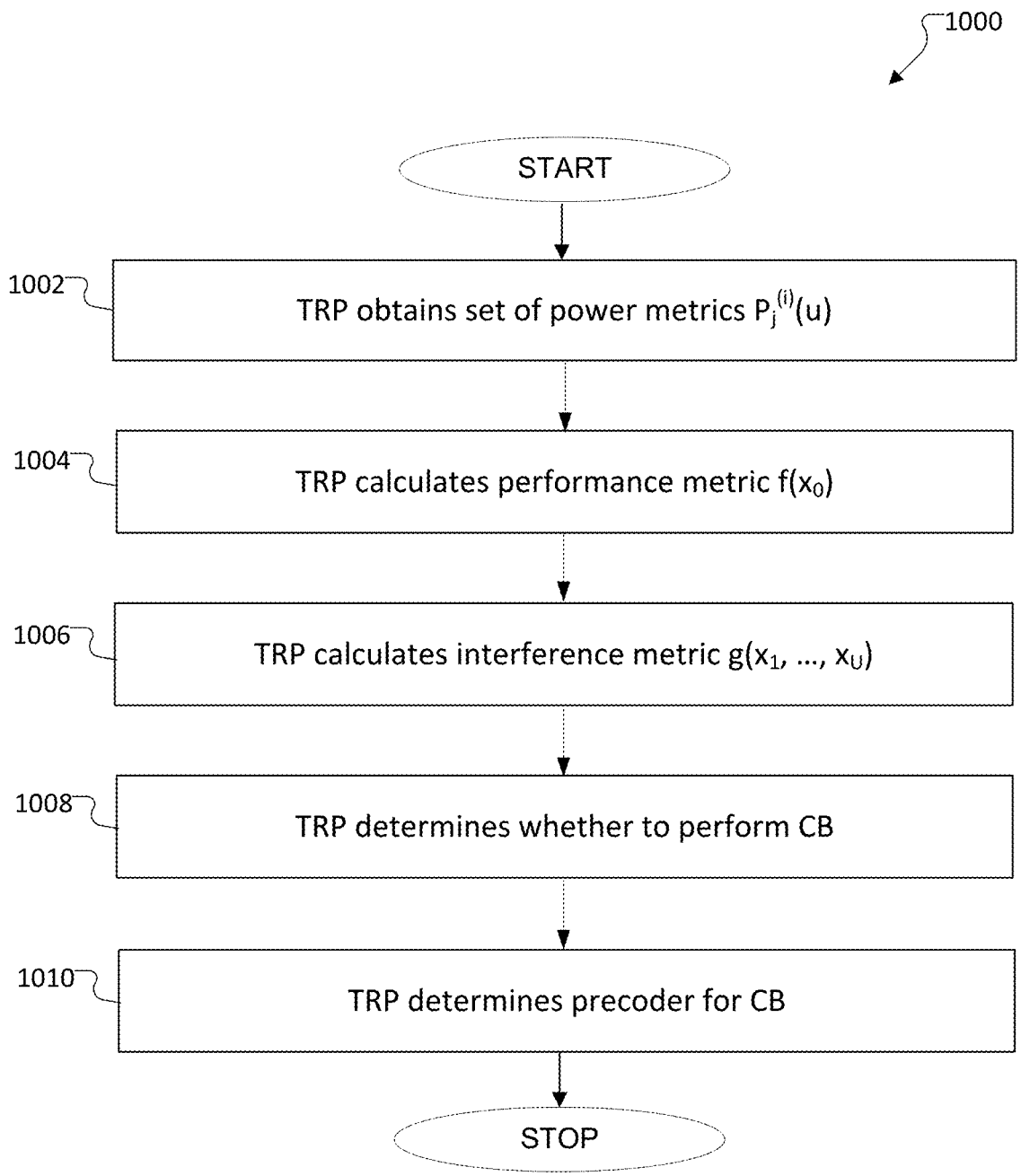
FIG. 10 illustrates a flow chart of a method for implementing a set of rules for triggering coordinated beamforming according to embodiments of the present disclosure.

FIG. 10 illustrates a flow chart of a method 1000 for implementing a set of rules for triggering coordinated beamforming according to embodiments of the present disclosure, as may be performed by a TRP (e.g., the TRP 601-602 as illustrated in FIG. 6). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1002. In step 1002, a TRP obtains a set of power metrics for multiple UEs including a served UE and one or more helped UEs. Each power metric is estimated from multiple channel quality and performance indicators of one of the multiple UEs. This could include, for example, the TRP 601 performing operations 701 and 702 to obtain a set of power metrics $P_j^{(i)}(u)$ for the served UE 611 and the helped UE 612.

At step 1004, the TRP calculates a performance metric as a function of at least one of the multiple channel quality and performance indicators of the served UE. This could include, for example, the TRP 601 performing operation 703 to calculate the performance metric $f(x_0)$ of the served UE 611.

At step 1006, the TRP calculates an interference metric as a function of the set of power metrics. This could include, for example, the TRP 601 performing operation 704 to calculate the interference metric $g(x_1, \ldots, x_U)$.

At step 1008, the TRP determines whether to perform CB based on the performance metric and the interference metric. This could include, for example, the TRP 601 performing operation 705 and traversing one of the decision trees 750, 800, 900 to determine whether to perform CB.

At step 1010, the TRP determines one or more precoders based on the determination of whether to perform the coordinated beamforming. This could include, for example, the TRP 601 performing operation 706 to determine one or more precoders for CB.

Although FIG. 10 illustrates one example of a method 1000 for implementing a set of rules for triggering coordinated beamforming, various changes may be made to FIG. 10. For example, while shown as a series of steps, various steps in FIG. 10 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    obtaining, by a transmit-receive point (TRP), a set of power metrics for multiple UEs including a served UE and one or more helped UEs, wherein each power metric is estimated from multiple channel quality and performance indicators of one of the multiple UEs;
    calculating a performance metric as a function of at least one of the multiple channel quality and performance indicators of the served UE;
    calculating an interference metric as a function of the set of power metrics, the interference metric indicating an amount of interference from the TRP that is experienced by the one or more helped UEs;
    determining whether to perform coordinated beamforming based on the performance metric and the interference metric; and
    determining one or more precoders based on the determination of whether to perform the coordinated beamforming.

2. The method of claim 1, wherein determining whether to perform the coordinated beamforming comprises:
    deciding to perform the coordinated beamforming when (i) the performance metric is greater than a first threshold, or (ii) the performance metric is between the first threshold and a second threshold and the interference metric is less than a third threshold; and
    deciding to not perform the coordinated beamforming when (i) the performance metric is less than the second threshold, or (ii) the performance metric is between the first threshold and the second threshold and the interference metric is less than the third threshold.

3. The method of claim 1, wherein obtaining the set of power metrics for the multiple UEs comprises:
    calculating the power metric for the served UE; and
    receiving the power metric for the one or more helped UEs from one or more other TRPs serving the one or more helped UEs.

4. The method of claim 1, wherein the multiple channel quality and performance indicators comprise two or more of Received Signal Strength Indicator (RSSI), Reference Signal Received Power (RSRP), and Reference Signal Received Quality (RSRQ).

5. The method of claim 4, wherein the interference metric is a function of an i-th percentile of a difference between the RSRP and the RSRQ of the one or more helped UEs.

6. The method of claim 1, wherein the performance metric is a channel quality indicator (CQI) of the served UE.

7. The method of claim 1, wherein the performance metric is a function of two or more of the multiple channel quality and performance indicators of the served UE.

8. A transmit-receive point (TRP) comprising:
    a memory configured to store instructions; and
    a processor operably connected to the memory, the processor configured when executing the instructions to:
        obtain a set of power metrics for multiple UEs including a served UE and one or more helped UEs, wherein each power metric is estimated from multiple channel quality and performance indicators of one of the multiple UEs;
        calculate a performance metric as a function of at least one of the multiple channel quality and performance indicators of the served UE;
        calculate an interference metric as a function of the set of power metrics, the interference metric indicating an amount of interference from the TRP that is experienced by the one or more helped UEs;
        determine whether to perform coordinated beamforming based on the performance metric and the interference metric; and
        determine one or more precoders based on the determination of whether to perform the coordinated beamforming.

9. The TRP of claim 8, wherein to determine whether to perform the coordinated beamforming, the processor is configured to:
    decide to perform the coordinated beamforming when (i) the performance metric is greater than a first threshold, or (ii) the performance metric is between the first threshold and a second threshold and the interference metric is less than a third threshold; and decide to not perform the coordinated beamforming when (i) the performance metric is less than the second threshold, or (ii) the performance metric is between the first threshold and the second threshold and the interference metric is less than the third threshold.

10. The TRP of claim 8, wherein to obtain the set of power metrics for the multiple UEs, the processor is configured to:
calculate the power metric for the served UE; and
receive the power metric for the one or more helped UEs from one or more other TRPs serving the one or more helped UEs.

11. The TRP of claim 8, wherein the multiple channel quality and performance indicators comprise two or more of Received Signal Strength Indicator (RSSI), Reference Signal Received Power (RSRP), and Reference Signal Received Quality (RSRQ).

12. The TRP of claim 11, wherein the interference metric is a function of an i-th percentile of a difference between the RSRP and the RSRQ of the one or more helped UEs.

13. The TRP of claim 8, wherein the performance metric is a channel quality indicator (CQI) of the served UE.

14. The TRP of claim 8, wherein the performance metric is a function of two or more of the multiple channel quality and performance indicators of the served UE.

15. A non-transitory computer readable medium comprising a plurality of instructions that, when executed by at least one processor, is configured to cause the at least one processor to:
obtain a set of power metrics for multiple UEs including a served UE of a transmit-receive point (TRP) and one or more helped UEs of the TRP, wherein each power metric is estimated from multiple channel quality and performance indicators of one of the multiple UEs;
calculate a performance metric as a function of at least one of the multiple channel quality and performance indicators of the served UE;
calculate an interference metric as a function of the set of power metrics, the interference metric indicating an amount of interference from the TRP that is experienced by the one or more helped UEs;
determine whether to perform coordinated beamforming based on the performance metric and the interference metric; and
determine one or more precoders based on the determination of whether to perform the coordinated beamforming.

16. The non-transitory computer readable medium of claim 15, wherein to determine whether to perform the coordinated beamforming, the plurality of instructions is configured to cause the at least one processor to:
decide to perform the coordinated beamforming when (i) the performance metric is greater than a first threshold, or (ii) the performance metric is between the first threshold and a second threshold and the interference metric is less than a third threshold; and
decide to not perform the coordinated beamforming when (i) the performance metric is less than the second threshold, or (ii) the performance metric is between the first threshold and the second threshold and the interference metric is less than the third threshold.

17. The non-transitory computer readable medium of claim 15, wherein to obtain the set of power metrics for the multiple UEs, the plurality of instructions is configured to cause the at least one processor to:
calculate the power metric for the served UE; and
receive the power metric for the one or more helped UEs from one or more other TRPs serving the one or more helped UEs.

18. The non-transitory computer readable medium of claim 15, wherein the multiple channel quality and performance indicators comprise two or more of Received Signal Strength Indicator (RSSI), Reference Signal Received Power (RSRP), and Reference Signal Received Quality (RSRQ).

19. The non-transitory computer readable medium of claim 18, wherein the interference metric is a function of an i-th percentile of a difference between the RSRP and the RSRQ of the one or more helped UEs.

20. The non-transitory computer readable medium of claim 15, wherein the performance metric is a function of two or more of the multiple channel quality and performance indicators of the served UE.

* * * * *